United States Patent
Bastide et al.

(10) Patent No.: US 10,742,581 B2
(45) Date of Patent: Aug. 11, 2020

(54) SUMMARIZATION-BASED ELECTRONIC MESSAGE ACTIONS

(71) Applicant: International Business Machines Corporation, Armonk, NY (US)

(72) Inventors: Paul R. Bastide, Boxford, MA (US); Asima Silva, Holden, MA (US); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

(21) Appl. No.: 16/025,959

(22) Filed: Jul. 2, 2018

(65) Prior Publication Data

US 2020/0007482 A1 Jan. 2, 2020

(51) Int. Cl.
*H04L 12/58* (2006.01)
*G06F 16/34* (2019.01)

(52) U.S. Cl.
CPC ............ *H04L 51/16* (2013.01); *G06F 16/345* (2019.01)

(58) Field of Classification Search
CPC .............. G06F 17/2785; G06F 13/345; G06F 17/30719; G06Q 10/107; H04L 29/08927; H04L 29/08936; H04L 51/04; H04L 51/06; H04L 51/063; H04L 51/066; H04L 51/08; H04M 3/537
See application file for complete search history.

(56) References Cited

U.S. PATENT DOCUMENTS

| 8,811,590 | B2 | 8/2014 | Zernik | |
| 9,223,859 | B2 * | 12/2015 | Manera | G06F 16/345 |
| 9,560,152 | B1 | 1/2017 | Jamdar | |
| 2002/0078091 | A1 * | 6/2002 | Vu | G06F 16/345 |
| | | | | 715/203 |
| 2003/0139902 | A1 | 7/2003 | Geib | |

(Continued)

FOREIGN PATENT DOCUMENTS

WO WO-2011008886 A1 7/2010

OTHER PUBLICATIONS

Anonymous; "Method of an Automatic & Customized summary creation from email content at client end based on keywords/policies set and self-learning algorithms"; (continued) May 31, 2011; IPCOM000275520; 5 pages.

(Continued)

*Primary Examiner* — Hai V Tran
*Assistant Examiner* — Tien M Nguyen
(74) *Attorney, Agent, or Firm* — Fabian VanCott; Steven L. Nichols

(57) ABSTRACT

Summarization-based electronic message actions are described. A system includes a monitor to monitor an electronic communication stream, which electronic communication stream includes past electronic messages between various users. A summarizer of the system 1) determines, based on an output of the monitor, a desired summarization level for a current electronic message having certain characteristics and 2) determines a current summarization level for the current electronic message. When the current summarization level is different than the desired summarization level, an action engine takes an action against the current electronic message.

20 Claims, 5 Drawing Sheets

(56) References Cited

U.S. PATENT DOCUMENTS

| | | | |
|---|---|---|---|
| 2010/0031142 A1* | 2/2010 | Nagatomo | G06F 16/345 |
| | | | 715/254 |
| 2010/0121849 A1 | 5/2010 | Goeldi | |
| 2013/0018955 A1 | 1/2013 | Thaxton | |
| 2014/0280614 A1* | 9/2014 | Alakuijala | H04L 51/32 |
| | | | 709/206 |
| 2016/0012053 A1* | 1/2016 | Weening | G06F 16/435 |
| | | | 707/723 |
| 2017/0161372 A1 | 6/2017 | Fernandez | |
| 2018/0048595 A1 | 2/2018 | Dotan-Cohen | |

OTHER PUBLICATIONS

Venolia, G. D., & Neustaedter, C.; "Understanding sequence and reply relationships with email converstations: A mixed-model visualization"; Apr. 5-10, 2003; Proceedings (continued) of the SIGCHI conference on Human factors in computing systems; vol. No. 5, Issue No. 1, Ft. Lauderdale, Florida; pp. 361-368.

Facebook Launches Advanced AI Effort to Find Meaning in Your Posts; 23 pages; retrieved from the internet on Jul. 2, 2018; (continued) http://tech.slashdot.org/story/1831239/facebook-launches-advanced-aieffort-to-find-meaning-in-your-posts.

SaneBox for Business; retrieved from the internet on Jul. 2, 2018; https://www.sanebox.com/business; 3 pages.

Pam Dyer; "Understanding Facebook EdgeRank Infographic"; May 6, 2013; 4 pages; SocialMediaToday; (continued) https://www.socialmediatoday.com/content/understanding-facebook-edgerank-infographic.

\* cited by examiner

SUMMARIZATION-BASED ELECTRONIC MESSAGE ACTIONS

BACKGROUND

The present invention relates to the presentation of an electronic message to a recipient, and more specifically to taking an action against an electronic message based on a difference between a desired level of summarization for the electronic message and an actual level of summarization for the electronic message. Through any number of electronic communication channels, users share information and collaborate. For example, users via a chat service, email service, activity stream, or other forum, users can send electronic messages to one another.

SUMMARY

According to an embodiment of the present invention, a system for taking an action against an electronic message based on a summarization level of the electronic message is described. The system includes a monitor to monitor an electronic communication stream. The electronic communication stream includes past electronic messages between various users. A summarizer of the system 1) determines, based on an output of the monitor, a desired summarization level for a current electronic message having certain characteristics and 2) determines a current summarization level for the current electronic message. An action engine of the system, takes an action against the current electronic message when the current summarization level is different than the desired summarization level.

A computer-implemented method is also described. In the method, past electronic messages between various users are monitored. A desired summarization level for a current electronic message having certain characteristics is determined based on past electronic messages that have the same certain characteristics. A current summarization level for the current electronic message is also determined. A difference between the desired summarization level and the current summarization level is evaluated. When the current summarization level is different than the desired summarization level, an action is taken against the current electronic message.

The present specification also describes a computer program product. The computer program product includes a computer readable storage medium having program instructions embodied therewith. The program instructions are executable by a processor to cause the processor to 1) monitor an electronic communication stream which includes past electronic messages between various users and 2) determines a desired summarization level for a current electronic message having certain characteristics based on past electronic messages that have the same certain characteristics. In this example, the certain characteristics include participants and topics. The program instructions are also executable by the processor to cause the processor to 1) determine a current summarization level for the current electronic message, 2) evaluate a difference between the desired summarization level and the current summarization level, and 3) when the current summarization level is different than the current summarization level, take an action against the current electronic message.

DETAILED DESCRIPTION

Figure 1:
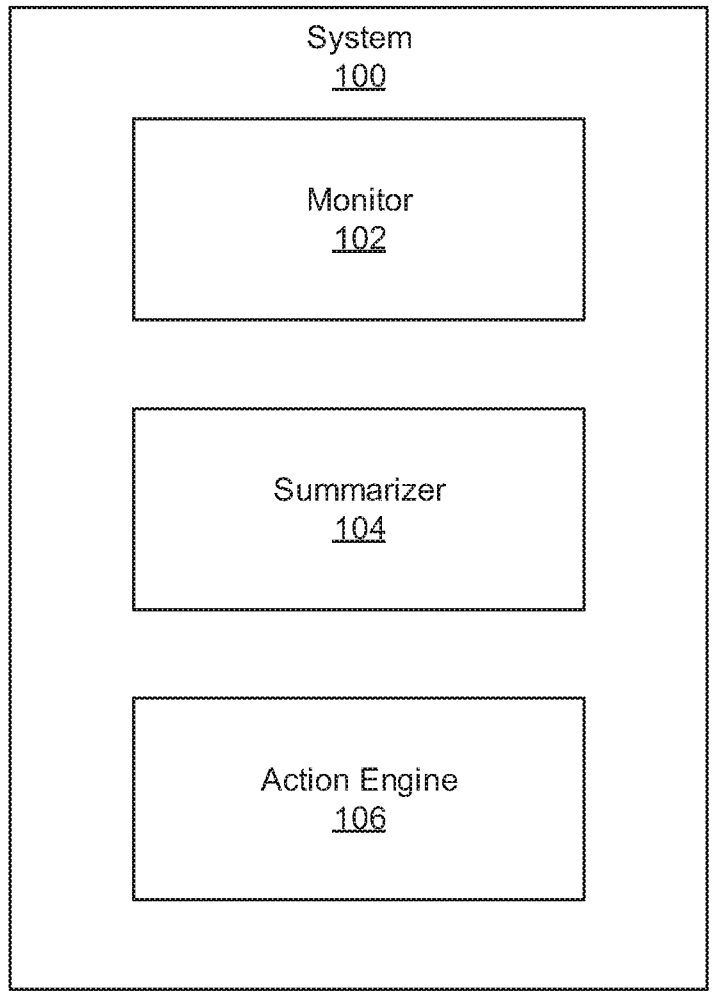
FIG. 1 depicts a system for summarization-based electronic message actions, according to an example of principles described herein.

The present invention may be a system, a method, and/or a computer program product at any possible technical detail level of integration. The computer program product may include a computer readable storage medium (or media) having computer readable program instructions thereon for causing a processor to early out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A. computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk. C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Electronic devices have provided new and developing methods of communication. For example, social media platforms and other online forums provide users with ways to communicate directly with a particular individual or to a larger group of users via a public post. In yet another example, users within an organization can use electronic forms of communication to share information and to collaborate on different projects. However, while such electronic forms of communication have undoubtedly provided new levels of communication, some aspects may reduce their effectiveness.

For example, the simplicity of electronic communication, and the ability of any user on a system to take part in electronic communications, may lead to an increased quantity of messages shared via an electronic platform. This increased quantity could overwhelm recipients such that the time demands of addressing the quantity of electronic messages is greater than the time a recipient has available for such review. For example, a manager at a manufacturing company may receive hundreds of emails each day. Obviously it would be overly cumbersome, inefficient, and irresponsible for the manager to spend all his time responding to these emails without attending to his other duties.

Accordingly, the present specification describes methods and systems for summarizing an electronic message to a desired level. For example, a sender may generate an email message to be sent to his or her manager. The system may determine what a desired level of summarization for this type of email message would be and then determines what the actual level of summarization for this email message is. Based on the difference an action is taken, such as prompting the author to increase the summarization level, i.e., further summarize, the email message before sending. Doing so increases the efficiency of a particular electronic message such that it may be regarded by a recipient more effectively.

As used in the present specification and in the appended claims, the term "a number of" or similar language is meant to be understood broadly as any positive number including 1 to infinity.

Turning now to the figures, FIG. 1 depicts a system (100) for summarization-based electronic message actions, according to an example of principles described herein. To achieve its desired functionality, the system (100) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. Alternatively, one processor may execute the designated function of each of the components.

The system (100) includes a monitor (102) to monitor and analyze an electronic communication stream between various users. As used in the present specification, the term "electronic communication stream" refers to electronic communications that pass via a particular platform. For example, a social media platform may have an electronic communication stream of all its users. In another example, an organization with a closed, and internal, messaging platform may also have an electronic communication stream of the members of the organization. Accordingly, the electronic communication stream for these platforms and others includes the past electronic messages that have been shared between its users.

As such, the monitor (102) may monitor all electronic communications in the stream. The monitor (102) may collect data relative to past electronic messages, which data may be sorted per user. That is, the monitor (102) may store information in a database that is organized per user of the electronic communication platform. The data may indicate with whom the different users communicate and what the different users communicate about. As a specific example, the monitor (102) may determine for a first user, which other users communicate with the first user and when those other users communicate with the first user. While specific reference is made to particular pieces of data collected regarding electronic messages in an electronic communication stream, any number of pieces of information could be collected by the monitor (102) of the system (100).

This collected information is used by a summarizer (104) to perform various functions. First, the summarizer (104) determines a desired summarization level for a current electronic message having certain characteristics. The summarizer (104) also determines a current summarization level for the current electronic message. The summarizer (104) also determines a difference between a desired summarization level for the current electronic message and the actual level of summarization for the current electronic message.

The desired summarization level refers to a summarization level that is desired for the current electronic message and may be based on characteristics of the current electronic message. For example, the characteristics of a user or a topic of the current electronic message may dictate a particular level of summarization. As a specific example, User A and User B may report to a Manager. In this example, the Manager may ask for an update from User A and User B. In this example, User B may provide a detailed response, which may be undesirable to the Manager as it is too time-consuming to read and review. Accordingly, in this example, the summarizer (104) may determine what the desired level of summarization for this update is and may determine a difference between the actual level of summarization for the update. Electronic messages that are effectively summarized can lead to greater clarity and more effective operations.

As described above, the desired summarization level may be determined based on certain characteristics of the current electronic message. For example, a topic of an electronic message may dictate to what degree an electronic message should be summarized. For example, certain topics may warrant more summary, i.e., less detail, and other topics may warrant less summary, i.e., more detail. As a specific example, an upcoming release of a relevant product may to justify a lot of detail in any associated electronic message. By comparison, an electronic message relating to an update on a status of a minor product may be best communicated with little details. Accordingly, one characteristic upon which a desired summarization level is determined may be a topic of the current electronic message.

In another example, a characteristic upon which a desired summarization level is determined includes a level of attention to a topic to which the current electronic message is directed. For example, those topics that are addressed more frequently in electronic messages may command a higher degree of summarization based on a familiarity with the topic, or a higher degree of detail as the greater attention to this topic may indicate a relative importance. As an example, an upcoming release of a marketing product may suggest either a higher level of summary as associated users are familiar with the upcoming release or may suggest a lower level of summary and more detail as it is a pending project. In either case, the level of attention to a particular topic may alter the desired summarization level.

Such a level of attention could be determined based on a quantity of past electronic messages relating to the topic and a frequency of past electronic messages relating to the topic. For example, it may be the case that while not many messages have been shared relative to a topic, they are shared close together indicating a relative importance/attention. In yet another example, the level of attention may be based on a recency of the electronic messages elated to the topic. For example it may be the case that while not many messages have been shared relative to a topic, they have been within the past few days and as such indicate a relative importance/attention for that project. Accordingly, the desired summarization level for a current electronic message may be selected based on a level of attention in past electronic message to the topic of the current electronic message.

In another example, the characteristics on which a desired summarization level is determined includes characteristics of the participants. For example, if a recipient of the current electronic message is a manager of a group of users, then a greater degree of summarization may be desired to accommodate the time constraints of the manager. By comparison, if the current electronic message is between developers, a greater degree of detail may be desired. In another example, the characteristics of a user that may alter the desired summarization level include preferences of the user. For example, each user may have a profile in which they can expressly indicate how much detail they would like to see in relation to various other users, topics, etc. For example, a manager may indicate that from his sub-managers be would like more detail on particular topics, but would like more summary from a human resources manager.

Not only the characteristics, but the level of communication between the users may be characteristics upon which the desired summarization level is based. Again, whether there be a lot or relatively few electronic messages between the participants may either 1) increase the desired summarization level, or 2) reduce the desired summarization level, but it remains that in either case a desired summarization level is selected based on the quantity of communications between participants in the current electronic message.

In determining the desired summarization level, the summarizer (104) may consider past electronic messages sharing the same certain characteristics. That is, historical trends relating to past electronic messages that share characteristics with the current electronic message can be used to determine what a desired summarization level is. In so doing, the summarizer (104) first determines a level of summarization for past electronic messages with the certain characteristics, which characteristics may include topics, characteristics of associated users, and a level of attention among other characteristics. The summarization level may be determined based on any number of factors. For example, message analytics such as natural language processing may be used to determine a level of summarization of past electronic messages. The determined level of summarization for past electronic messages may be based on any number of criteria such as the presence of keywords, the frequency of the keywords, and the quantity and frequency of words unrelated to the topic. Other examples of criteria that may be used to determine the level of summary of past electronic messages include word count, etc.

In determining the desired summarization level, the summarizer (104) then determines an effectiveness, adequacy, or acceptance of the summarization level of the past electronic messages. The acceptance, adequacy, or effectiveness may be determined in any number of ways. For example, if an email is accessed it may indicate that the associated level of summary is adequate. In another example, if an electronic message is not accessed it may indicate that that electronic message, and its corresponding summarization level is not effective. As another example, adequacy or effectiveness may be determined based on recipient action. For example, if a recipient opens an electronic message, but does not spend a threshold amount of time with the electronic message window open, it may be determined that such is ineffective. Or if a recipient opens an electronic message, but does not scroll down, it may be determined that this level of summary is ineffective. By comparison, if a user does open an electronic message and scrolls down, or spends a threshold amount of time with the electronic message window open, it may be determined that the summarization level for that electronic message is sufficient. In yet another example, a recipient or other user may indicate the adequacy or effectiveness of a particular summarization level based on explicit input. For example, a user may indicate via an icon that the particular electronic message was either too detailed or not detailed enough. As yet another example, the summarizer (104) may look at an eye gaze to determine the focus of the user on the electronic message. In any of the above examples, data may be stored in a historic table, and queried to determine a frequency and degree of summarization. Following such a query, an appropriate action can be carried out.

Accordingly, as has been described, past electronic messages with the certain characteristics may be analyzed to determine whether their corresponding level of summarization is well-received and effective. While particular reference is made to criteria by which it may be determined that past summarization levels are sufficient, any different method of determining summarization level adequacy may be implemented in accordance with the principles described herein.

As described above, different desired summarization levels may be determined for electronic messages with different characteristics, in some cases even if some of the characteristics are the same. For example, even though two different electronic messages may be directed to the same topic, they may have different desired summarization levels based on each electronic message having different recipients. Accordingly, the summarizer (104) may include a database that, per these different characteristics, stores a desired summarization level.

In some examples, the different desired summarization levels may be based on an origin of the data from which a decision is made. That is, an electronic message has a body and metadata associated with it. In this example, even though the metadata is the same, if the body, or content, of the message is different, then the desired summarization level may be different. As a specific example, User A may be a participant in a marketing communication and may also be a participant in a message relating to hibernation of operating systems. Notwithstanding that User A is a participant in both, as identified by the metadata, i.e., destination address, the desired summarization level for these messages may be different based on the content, i.e., marketing vs. hibernation of operating systems.

The summarizer (104) also determines a current summarization level for the current electronic message. As with determining a summarization level for past electronic messages, the summarizer (104) may determine the summarization level of the current electronic message based on any number of factors. For example, the determined level of summarization for a current electronic message may be based on any number of criteria such as the presence of keywords, the frequency of the keywords, and the quantity and frequency of words unrelated to the topic. Other examples of criteria that may be used to determine the level of summary of the current electronic message includes word count, etc. In both cases, i.e., the desired summarization level and the current summarization level, may be represented as scores, or values indicative of the summarization level. Doing so allows for simple comparison of the two.

The system (100) also includes an action engine (106) to take an action against the current electronic message based on a difference between the desired summarization level and an actual, or current, summarization level. For example, if a current email message is more detailed than desired, the action engine (106) may automatically summarize the current email message or may prompt the author to further summarize the email message. In another example, if a generated email message is less detailed than desired, the action engine (106) may automatically add detail to the email message or may prompt the author to increase the detail.

A particular example is now provided. In this example, User A drafts an email message to his Manager. In this example, the email message is related to Product A. In this example, the monitor (102) continually monitors electronic communications between the Manager and User A as well as others. Using the data collected from such an analysis, the summarizer (104) determines that past email messages related to Product A addressed to the Manager have a desired summarization score of 90 and that this particular email message from User A to the Manager has a current summarization score of 70, indicating it includes more detail than is the norm, or that is effective. Accordingly, the action engine (106) may either 1) automatically further summarize the email message from User A to the Manager or 2) prompt User A to reduce the detail of the email message.

Accordingly, the system (100) as described herein allows for effective electronic communications by ensuring that electronic messages meet a certain threshold regarding the amount of detail/summary they provide. As such information is based on users, relationships, and topics, a customized solution for electronic message generation is provided, which facilitates even more effective and efficient electronic communication.

Specifically, the present system (100) improves computing functionality by more effectively summarizing electronic messages. That is, by basing the summarization performed on an electronic message on the specific characteristics of that message, the system (100) provides a more accurate summarization. The more accurate summarization, in addition to providing a benefit to users of the system, also benefits the computing device in which the system is disposed. For example, a more accurate summarization can enhance subsequent operations of the computing device, such as grouping of messages, or otherwise processing messages based on the summary. Moreover, as the summarization level of a particular electronic message may be increased, this effectively takes up less storage space and bandwidth on the computing device. Also, by shortening the length of at least some of the electronic messages, the system (100) allows a more condensed, and less cluttered display.

Thus, the system (100) allows a computing device enhanced functionality by providing for dynamic summarization. That is, rather than providing a one-time summarization for a single message, the system (100) provides the computing device with summarizations that 1) are customized per electronic message and that 2) can change as the characteristics on which a summarization is selected change over time. That is, the present system (100) allows a computing device to provide real-time, dynamic, and customized summarization. Such customized summarizations improve downstream processing by being shorter and on point.

Figure 2:
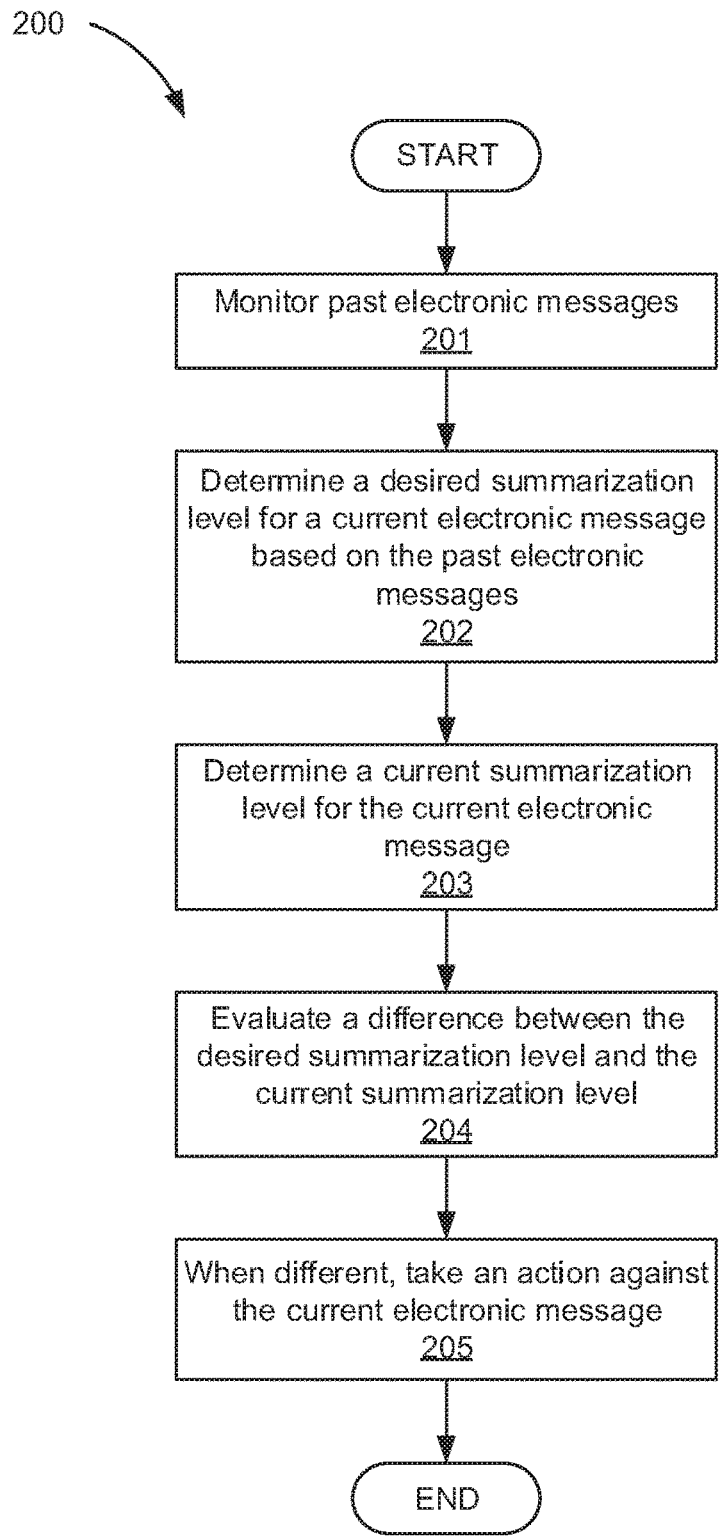
FIG. 2 depicts a flowchart of a method for summarization-based electronic message actions, according to an example of principles described herein.

FIG. 2 depicts a flow a of a method (200) for summarization-based electronic message actions, according to an example of principles described herein. According to the method (200), past electronic messages are monitored (block 201). That is, as electronic messages pass between users of a platform, content and metadata relating to these electronic messages are collected by a monitor (FIG. 1, 102). From the data collected, a desired summarization level is determined (block 202) for a current electronic message having certain characteristics. That is, each electronic message may have different characteristics such as a different topic, different authors/recipients, different levels of attention etc. The different characteristics may be based on different types of data, for example the content or body of an electronic message and metadata associated with the electronic message. These characteristics may suggest that a different summarization level should be used for associated electronic messages. The desired summarization level indicates an appropriate level of detail for an electronic message that has these certain characteristics. The desired summarization level for the current electronic message is based on past electronic messages that have the same certain characteristics. That is, it may be that for electronic messages that share characteristics, i.e., topics, participants, level of detail etc., should have similar summarization levels. Accordingly, the efficacy of summarization associated with past electronic messages with similar characteristics is analyzed to determine the desired summarization level for the current electronic message.

The desired summarization level can be determined (block 202) by 1) determining a summarization level of past electronic messages that have these certain characteristics and then 2) determining whether such a summarization level is effective, desired, and/or adequate. As described above, the desired summarization level may be a numeric score that is later used for comparison against a summarization level of a currently-generated electronic message.

The method (200) also includes determining (block 203) a current summarization level for the current electronic message. That is, as described above, the summarizer (FIG. 1, 104) can determine via any number of methods including keyword analysis and other mail analytics, a summarization level of the current electronic message. This current summarization level, like the desired summarization level and the summarization levels of past electronic messages may be a numeric score.

With both a desired summarization level and a current summarization level, the summarizer (FIG. 1, 104) may evaluate (block 204) a difference between the two. That is, the summarizer (FIG. 1, 104) may compare the numeric score for the current summarization level with the numeric score for the desired summarization level. With such a comparison made, the action engine (FIG. 1, 106) can take (block 206) an action against the current electronic message when the scores are different. As will be described below, such an action may relate to an adjustment of the level of detail of the current electronic message.

In some examples, the method (200) may be a push event wherein electronic messages that meet certain criteria are available to the system (FIG. 1, 100) for adjustment. In another example, the method (200) may be a pull event, wherein the system (FIG. 1, 100) operates on each electronic message that passes through. That is in some examples, the system (FIG. 1, 100) may analyze, and adjust the summarization level of, each electronic message and in other examples, the system (FIG. 1, 100) may analyze, and perform summarization for, a subset of electronic messages. The subset that are operated on may be selected based on any number of criteria including an electronic message length, participants in the electronic message, or a topic of the electronic message. In either case, determining (block 203) a current summarization level for the current electronic message, evaluating (block 204) a difference between the current summarization level and the desired summarization level, and taking (block 205) an action based thereon, occur without additional user input. In another example, such operations are performed following user authorization. In this example, a user interface may be presented wherein a user can opt into or opt out of these operations.

Accordingly, the method (200) provides for efficient and effective communication thus providing a benefit to both authors and recipient. An author by ensuring that their electronic message is read, and to a recipient by providing information to them in a desired manner.

Figure 3:
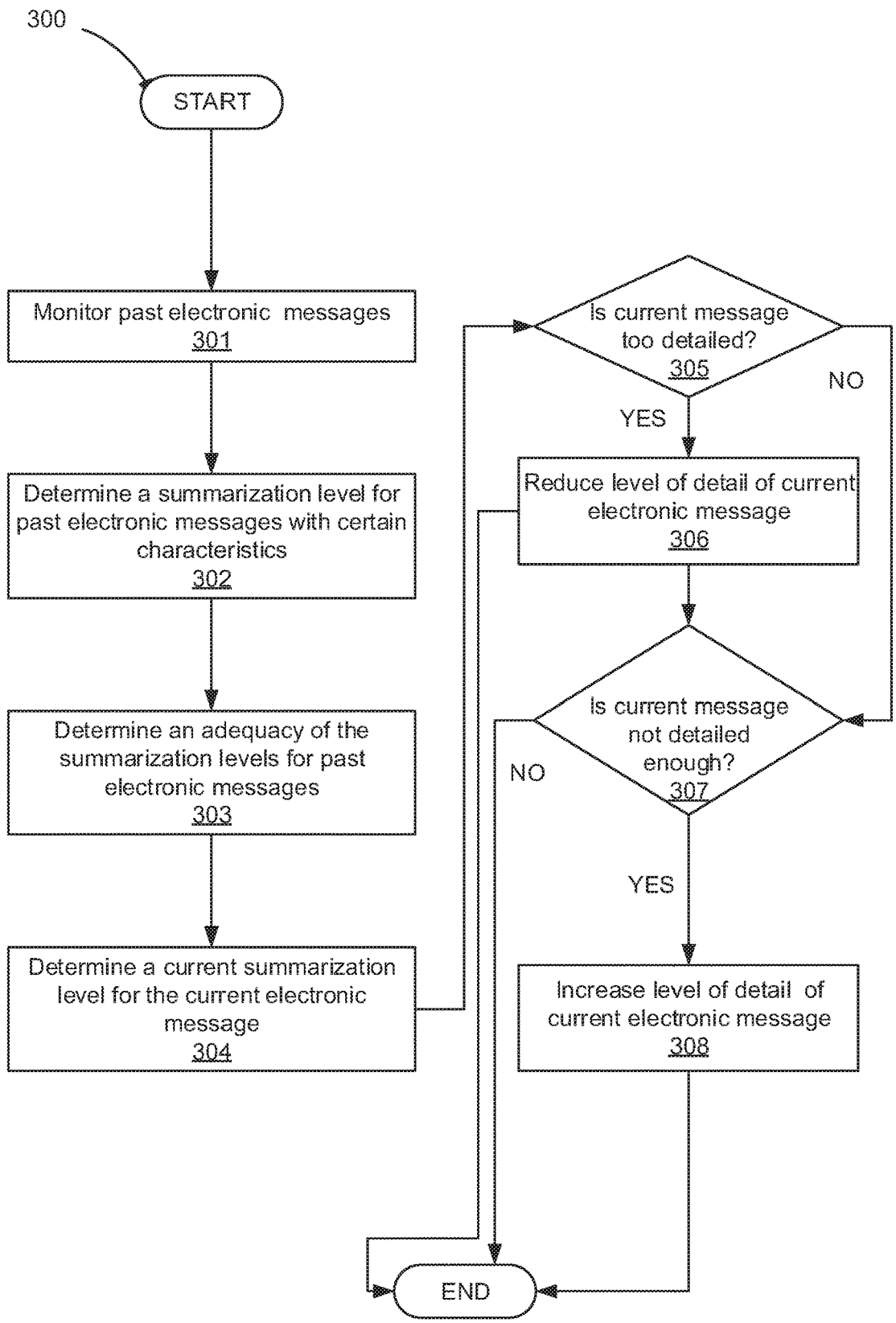
FIG. 3 depicts a flowchart of a method for summarization-based electronic message actions, according to another example of principles described herein.

FIG. 3 depicts a flowchart of a method (300) for summarization-based electronic message actions, according to another example of principles described herein. In this example, past electronic messages are monitored (block 301) and data collected therefrom. This may be performed as described above in connection with FIG. 2. As described above, a desired summarization level for a current electronic message having certain characteristics is then determined. This first includes determining (block 302) a summarization level for past electronic messages that have those certain characteristics. That is, the summarizer (FIG. 1, 104) considers the summarization level of a variety of electronic messages that have certain characteristics. The summarizer (FIG. 1, 104) then determines (block 303) an adequacy of those summarization levels. This may be done for example by mapping a recipient interaction to a summarization level. That is, if a past message with those characteristics has a summarization level that regularly results in the recipients reading the entirety of the message, as indicated by a user scrolling through an electronic message or viewing the electronic message for a predetermined period of time, then the summarizer (FIG. 1, 104) may determine that that particular summarization level is sufficient for electronic messages that share those characteristics, i.e., topics, participants, etc. By comparison, if a past message with those characteristics has a summarization level that does not result in the recipients reading the entirety of the message, then the summarizer (FIG. 1, 104) may determine that that particular summarization level is ineffective for electronic messages that share those characteristics, i.e., topics, participants, etc.

The system (FIG. 1, 100) then determines (block 304) a current summarization level for the current electronic message. These may be performed as described above in connection with FIG. 2.

As described above, based on the difference between the desired summarization level and the current summarization level, an action may be taken against the current electronic message. Such an action may be to adjust a level of detail of the current electronic message. Accordingly, from the comparison of the desired summarization level and the current summarization level it is determined (block 305) if the current electronic message contains too much detail, that is if it has a summarization level lower than the desired summarization Fwd. If the current electronic message is too detailed (block 305, determination YES), the action engine (FIG. 1, 106) can take an action against the current electronic message, specifically by reducing (block 306) the level of detail of the current electronic message. Reducing (block 306) the level of detail may include prompting the author to reduce the level of detail or reducing the level of detail automatically by further summarizing the electronic message.

In the case that the summarizer (FIG. 1, 104) automatically summarizes, the current electronic message, the summarizer (FIG. 1, 104) may find a subset of the current electronic message that conveys the information of the entire electronic message. In some examples, this may include extraction. That is, the summarized information is pulled from actual text of the current electronic message. In other examples, summarization includes abstraction, which is a paraphrasing of the current electronic message. An electronic message may be summarized in any number of ways including, but not limited to selecting the first and last sentence of an electronic message. In other examples, duplicate information may be removed, the core statement may be re-written, and extra words which are not necessary to convey the message may be removed. Still further, message summarization may include determining the keywords in an electronic message and basing the summary on those keywords. The keywords may be identified via their frequency within a document. While specific reference is made to particular operations to summarize the electronic message, other operations may be executed to summarize the current electronic message.

If the current electronic message is not too detailed (block 305, determination NO), it may be determined (block 307) if the current electronic message is not detailed enough. That is, based on a desired summarization level for the current electronic message, it may be determined that historically more detail, i.e., less summary, is desirable and more adequate. Accordingly, in this example, the level of detail of the current electronic message may be increased (block 308). This may be done for example, by prompting the user to provide more detail.

Figure 4:
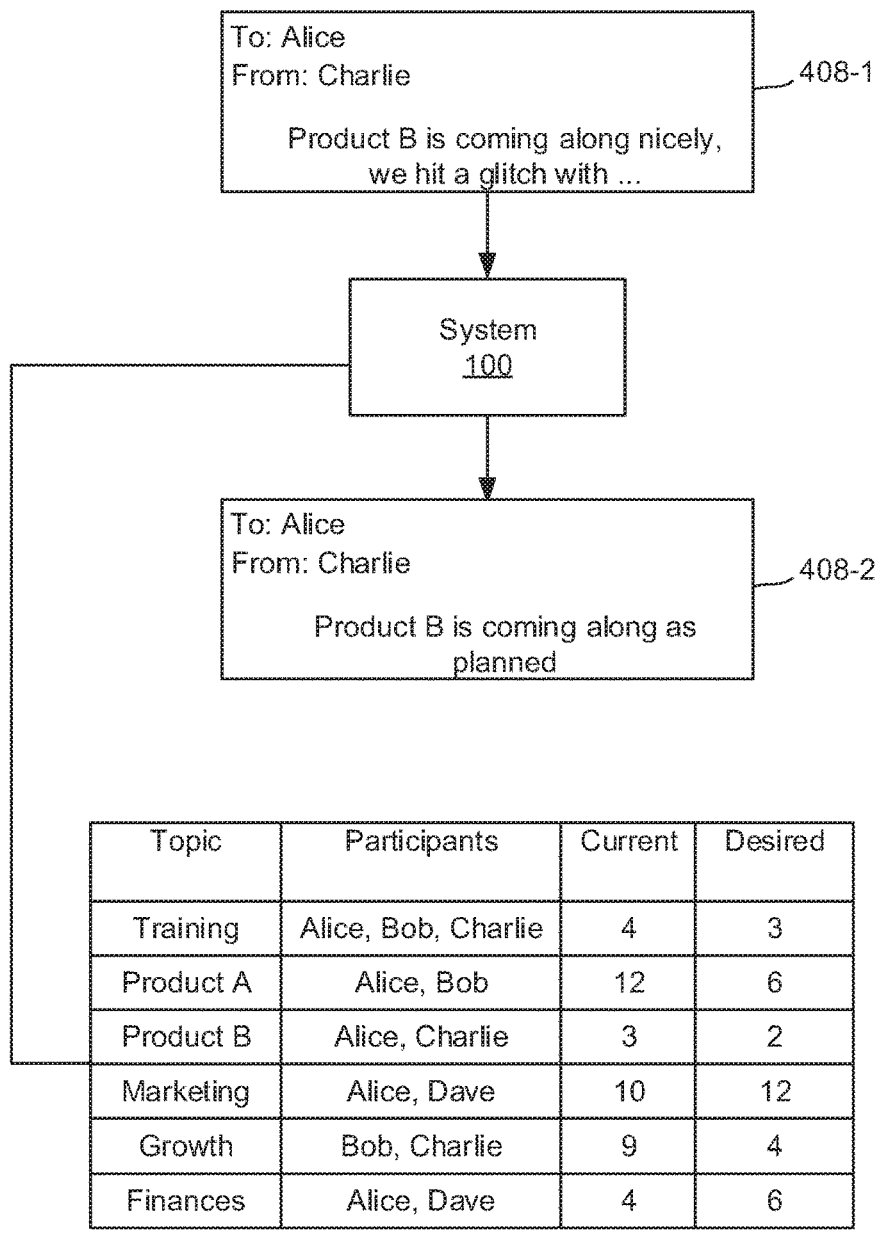
FIG. 4 depicts an action taken against an electronic message based on a current summarization level, according to an example of principles described herein.

FIG. 4 depicts an action taken against a current electronic message (408-1) based on a current summarization level, according to an example of principles described herein. In this example, an author. Charlie generates a current electronic message (408-1) to Alice that provides an update on Product B. At some point during its generation, the current electronic message (408-1) is passed to the system (100). As described above, the current electronic message (408-1) may be passed to the system (100) before it is posted or otherwise sent to the intended audience. In some examples, the system (100) may be activated during an analyze phase of message generation. The analyze phase may be triggered by a lack of user action for a predetermined period of time or by a user action such as clicking on a "send," "post," or other action.

In this example, once the current electronic message (408-1) is within the operations of the system (100) the adjustment to the current electronic message (408-1) takes place. That is, the monitor (FIG. 1, 102) collects data from past electronic messages which data indicates a timing of sending and the participants in the communication. Specifically, the monitor (FIG. 1, 102) collects data from past electronic messages between Alice and Charlie relating to Product B. The summarization of these particular pat electronic messages are considered and measured. Such information is used by the summarizer (FIG. 1, 104) to determine a desired summarization level for such communications, which in the example provided is a numeric value of 2.

In a similar fashion, the summarization level of the current electronic message (408-1) is determined by the system and given a numeric value of 3. In this example, a higher numeric value may indicate more detail and a lower numeric value indicates greater summary. While reference is made to a particular scale, i.e., lower numbers meaning greater summary, higher numbers meaning less summary, any appropriate scale may be used.

Returning to the example, the current summarization score being greater than the desired summarization score indicates that the current electronic message (408-1) may include more detail than is desired for this type of electronic message. Accordingly, the current summarization level for the current electronic message (408-1) and the desired summarization level are then compared with a difference being accounted for by the action engine (FIG. 1, 106). For example, the action engine (FIG. 1, 106) may either reduce or enlarge the amount of detail present in the current electronic current message (408-1) to generate an adjusted electronic message (408-2) that has been adjusted based on circumstances. In this particular example, the action engine (FIG. 1, 106) may reduce the level of detail, either automatically or via a prompt to Charlie, thus resulting in an adjusted electronic message (408-2) that is more summarized than the original version. Thus, the present system (100) provides a way for a desired amount of detail to be included in an electronic message for a given audience, topic, etc., thus enhancing the efficacy of the electronic message for a variety of participants.

Figure 5:
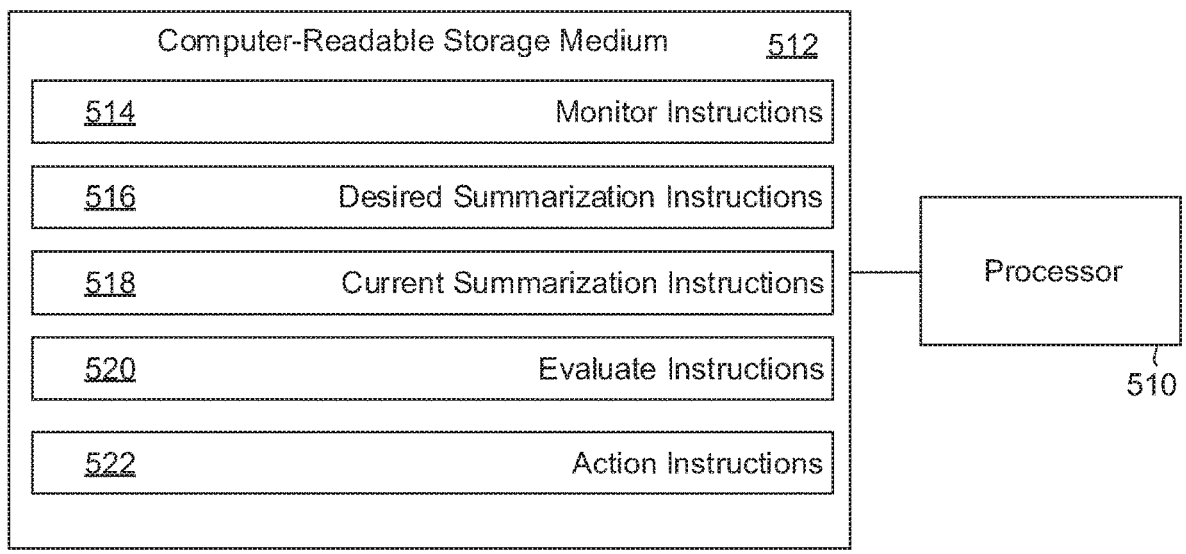
FIG. 5 depicts a computer readable storage medium for summarization-based electronic message actions, according to an example of principles described herein.

FIG. 5 depicts a computer readable storage medium (512) for summarization-based electronic message actions, according to an example of principles described herein. To achieve its desired functionality, a computing system includes various hardware components. Specifically, a computing system includes a processor (510) and a computer-readable storage medium (512). The computer-readable storage medium (512) is communicatively coupled to the processor (510). The computer-readable storage medium (512) includes a number of instructions (514, 516, 518, 520, 522) for performing a designated function. The computer-readable storage medium (512) causes the processor (510) to execute the designated function of the instructions (514, 516, 518, 520, 522).

Referring to FIG. 5, monitor instructions (514), when executed by the processor (510), cause the processor (510) to monitor an electronic communication stream which includes past electronic messages between various users. Desired summarization instructions (516), when executed by the processor (510), may cause the processor (510) to determine a desired summarization level for a current electronic message having certain characteristics based on past electronic messages that have the same certain characteristics, specifically the certain characteristics of shared participants and topics. Current summarization instructions (518), when executed by the processor (510), may cause the processor (510) to, determine a current summarization level for the current electronic message (FIG. 4, 408-1). Evaluate instructions (520), when executed by the processor (510), may cause the processor (510) to evaluate a difference between the desired summarization level and the current summarization level. Action instructions (522), when executed by the processor (510), may cause the processor (510) to when, the current summarization level is different than the current summarization level, take an action against the current electronic message.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a monitor to monitor an electronic communication stream, wherein the electronic communication stream comprises past electronic messages between various users;
   a summarizer to:
      determine a desired summarization level for a current electronic message having certain characteristics based on
         a summarization of the past electronic messages between the various users, which past electronic messages have the same certain characteristics; and
      determine a current summarization level for the current electronic message; and
   an action engine to, when the current summarization level is different than the desired summarization level, take an action against the current electronic message.

2. The system of claim 1, wherein the action engine, when the current summarization level is greater than the desired summarization level, takes an action to reduce the level of detail in the current electronic message.

3. The system of claim 1, wherein the action engine, when the current summarization level is less than the desired summarization level, takes an action to increase the level of detail in the current electronic message.

4. The system of claim 1, wherein the certain characteristics include characteristics of participants of the current electronic message.

5. The system of claim 1, wherein the certain characteristics include a topic of the current electronic message.

6. The system of claim 5, wherein the certain characteristics include a level of attention to the topic.

7. The system of claim 6, wherein the level of attention is based on at least one of:
   a quantity of past electronic messages relating to the topic;
   a frequency of past electronic messages relating to the topic; and
   a recency of past electronic messages related to the topic.

8. The system of claim 1, wherein the certain characteristics include a level of communication between participants of the current electronic message.

9. A computer-implemented method comprising:
   monitoring past electronic messages between various users;
   determining a desired summarization level for a current electronic message having certain characteristics based on a summarization level of the past electronic messages between the various users, which past electronic messages have the same certain characteristics;
   determining a current summarization level for the current electronic message;
   evaluating a difference between the desired summarization level and the current summarization level; and
   taking an action against the current electronic message based on a difference between the current summarization level and the desired summarization level.

10. The computer-implemented method of claim 9, wherein taking an action against the current electronic message comprises prompting an author to adjust the level of detail in the current electronic message.

11. The computer-implemented method of claim 9, wherein taking an action against the current electronic message comprises adjusting the level of detail in the current electronic message without further input from an author.

12. The computer-implemented method of claim 9, wherein determining a desired summarization level for a current electronic message having certain characteristics comprises performing message analytics on the past electronic messages having the certain characteristics.

13. The computer-implemented method of claim 9, wherein determining a desired summarization level for a current electronic message having certain characteristics comprises:
   determining a summarization level for the past electronic messages that have the certain characteristics; and
   determining an adequacy of the summarization level for the past electronic messages based on an interaction of a recipient with the past electronic messages.

14. The computer-implemented method of claim 9, wherein determining a current summarization level for the current electronic message, evaluating a difference between the desired summarization level and the current summarization level, and taking an action against the current electronic message are performed without additional user input.

15. The computer-implemented method of claim 9, wherein determining a current summarization level for the current electronic message, evaluating a difference between the desired summarization level and the current summarization level, and taking an action against the current electronic message are performed following user authorization.

16. A computer program product, the computer program product comprising a non-transitory computer readable storage medium having program instructions embodied therewith, the program instructions executable by a processor to cause the processor to:
   monitor an electronic communication stream, wherein the electronic communication stream comprises past electronic messages between various users;
   determine a desired summarization level for a current electronic message having certain characteristics based on a summarization level of the past electronic messages that have the same certain characteristics, wherein the certain characteristics comprise participants and topics;
   determine a current summarization level for the current electronic message;
   evaluate a difference between the desired summarization level and the current summarization level; and
   when the current summarization level is different than the current summarization level, take an action against the current electronic message.

17. The computer program product of claim 16, wherein determining a current summarization level for the current electronic message, evaluating a difference between the desired summarization level and the current summarization level, and taking an action against the current electronic message are performed for a subset of electronic messages in the electronic communication stream.

18. The computer program product of claim 16, wherein determining a current summarization level for the current electronic message, evaluating a difference between the desired summarization level and the current summarization level, and taking an action against the current electronic message are performed for all electronic messages in the electronic communication stream.

19. The computer program product of claim 16, wherein at least one of the desired summarization level and the current summarization level are represented as numeric values.

20. The computer program product of claim 16, wherein the desired summarization level varies for the topic and involved parties of the current electronic message.

* * * * *